(12) United States Patent
Andersson et al.

(10) Patent No.: US 7,136,536 B2
(45) Date of Patent: Nov. 14, 2006

(54) ADAPTIVE FILTER

(75) Inventors: Kenneth Andersson, Gävle (SE); Andreas Rossholm, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 11/302,045

(22) Filed: Dec. 13, 2005

(65) Prior Publication Data
US 2006/0133689 A1   Jun. 22, 2006

Related U.S. Application Data

(63) Continuation-in-part of application No. 11/022,064, filed on Dec. 22, 2004, now abandoned.

(51) Int. Cl.
*G06K 9/40* (2006.01)

(52) U.S. Cl. .................................... 382/261; 708/322

(58) Field of Classification Search ............... 382/260, 382/261, 254; 375/232, 233, 350; 708/360, 708/322, 323
See application file for complete search history.

(56) References Cited

U.S. PATENT DOCUMENTS

| | | | |
|---|---|---|---|
| 4,541,116 A | 9/1985 | Lougheed | |
| 4,941,191 A | 7/1990 | Miller et al. | |
| 5,367,385 A | 11/1994 | Yuan | |
| 5,488,420 A | 1/1996 | Bjontegaard | |
| 5,784,304 A * | 7/1998 | Koike | 708/322 |
| 5,819,035 A | 10/1998 | Devaney et al. | |
| 5,852,475 A | 12/1998 | Gupta et al. | |
| 5,877,813 A | 3/1999 | Lee et al. | |
| 5,940,455 A * | 8/1999 | Ikeda | 375/350 |
| 6,167,164 A | 12/2000 | Lee | |
| 6,226,050 B1 | 5/2001 | Lee | |
| 6,259,823 B1 | 7/2001 | Lee et al. | |
| 6,285,801 B1 | 9/2001 | Mancuso et al. | |
| 6,320,905 B1 | 11/2001 | Konstantinides | |
| 6,400,849 B1 | 6/2002 | Lee et al. | |
| 6,504,873 B1 | 1/2003 | Vehviläinen | |
| 6,539,060 B1 | 3/2003 | Lee et al. | |
| 6,594,400 B1 | 7/2003 | Kim | |
| 6,600,839 B1 | 7/2003 | Mancuso et al. | |
| 6,618,510 B1 | 9/2003 | Umiji | |
| 6,631,162 B1 | 10/2003 | Lee et al. | |
| 6,665,346 B1 | 12/2003 | Lee et al. | |
| 6,668,097 B1 | 12/2003 | Hu et al. | |

(Continued)

FOREIGN PATENT DOCUMENTS

EP   0 577 350 A2   1/1994

(Continued)

OTHER PUBLICATIONS

H.C. Reeve III et al., Reduction of Blocking Effect in Image Coding, Proc. ICASSP, 1983, pp. 1212-1215, Boston, Mass.

(Continued)

*Primary Examiner*—Von J. Couso
(74) *Attorney, Agent, or Firm*—Potomac Patent Group PLLC

(57) ABSTRACT

An adaptive filter that, in one embodiment, filters rows of pixels of an image in a vertical direction, stores the results in row vectors, and then filters the row vectors in the horizontal direction, and displays the results or stores the results for later display. Coefficients of a reference filter are modified based on the output from the reference filter through a table-lookup process that accesses tables of modified filter coefficients. The output of the modified filter is added to a delayed version of the input to provide the adaptive filter output.

52 Claims, 5 Drawing Sheets

U.S. PATENT DOCUMENTS

| | | | |
|---|---|---|---|
| 6,683,994 | B1 | 1/2004 | de Queiroz et al. |
| 6,697,126 | B1 | 2/2004 | Moni et al. |
| 6,724,944 | B1 | 4/2004 | Kalevo et al. |
| 6,738,528 | B1 | 5/2004 | Nio et al. |
| 6,748,113 | B1 | 6/2004 | Kondo et al. |
| 6,795,588 | B1 | 9/2004 | Nio et al. |
| 6,807,317 | B1 | 10/2004 | Mathew et al. |
| 6,904,087 | B1 * | 6/2005 | Li .............................. 375/232 |
| 6,931,063 | B1 | 8/2005 | Sun et al. |
| 2001/0003545 | A1 | 6/2001 | Hong |
| 2002/0118399 | A1 | 8/2002 | Estevez et al. |
| 2003/0026337 | A1 | 2/2003 | Hong |
| 2003/0044080 | A1 | 3/2003 | Frishman et al. |
| 2003/0053541 | A1 | 3/2003 | Sun et al. |
| 2003/0053708 | A1 | 3/2003 | Kryukov et al. |
| 2003/0053711 | A1 | 3/2003 | Kim |
| 2003/0081854 | A1 | 5/2003 | Deshpande |
| 2003/0086623 | A1 | 5/2003 | Berkner et al. |
| 2003/0147559 | A1 | 8/2003 | Jung |
| 2003/0190086 | A1 | 10/2003 | Kim |
| 2003/0202713 | A1 | 10/2003 | Sowa |
| 2003/0219074 | A1 | 11/2003 | Park et al. |
| 2003/0235248 | A1 | 12/2003 | Kim et al. |
| 2004/0008787 | A1 | 1/2004 | Pun et al. |
| 2004/0013315 | A1 | 1/2004 | Li et al. |
| 2004/0022315 | A1 | 2/2004 | Park et al. |
| 2004/0081368 | A1 | 4/2004 | Mathew et al. |
| 2004/0091168 | A1 | 5/2004 | Jones et al. |
| 2004/0101050 | A1 | 5/2004 | Lee et al. |
| 2004/0101059 | A1 | 5/2004 | Joch et al. |
| 2004/0120597 | A1 | 6/2004 | Le Dinh |
| 2005/0228841 | A1 * | 10/2005 | Grobert ...................... 708/422 |
| 2005/0265623 | A1 | 12/2005 | Estevez et al. |
| 2006/0056502 | A1 * | 3/2006 | Callicotte et al. ........... 375/232 |
| 2006/0110062 | A1 * | 5/2006 | Chiang et al. .............. 382/260 |

FOREIGN PATENT DOCUMENTS

| | | |
|---|---|---|
| EP | 0 881 837 A1 | 12/1998 |
| EP | 1 146 748 A2 | 10/2001 |
| WO | WO 02/07438 A1 | 1/2002 |
| WO | WO 02/096117 A1 | 11/2002 |
| WO | WO 2004/017157 A2 | 2/2004 |
| WO | WO 2004/054269 A1 | 6/2004 |

OTHER PUBLICATIONS

M.-Y. Shen et al., Review of Postprocessing Techniques for Compression Artifact Removal, J. Visual Communication and Image Representation, Mar. 1998, pp. 2-14, vol. 9, No. 1.

ITU-T Recommendation H.263 Appendix III: Examples for H.263 Encoder/Decoder Implementations, Jun. 2000.

G. Scognamiglio et al., Enhancement of Coded Video Sequences via an Adaptive Nonlinear Post-processing, Signal Processing: Image Communication, Feb. 2003, pp. 127-139, vol. 18, No. 2, Elsevier B.V.

R. Samadani et al., Deringing and Deblocking DCT Compression Artifacts with Efficient Shifted Transforms, Intl Conf. on Image Processing (ICIP), Oct. 2004, pp. 1799-1802, vol. 3, IEEE, Singapore.

Y.L. Lee et al., Loop-Filtering and Post-Filtering for Low Bit-Rates Moving Picture Coding, Intl Conf. on Image Processing (ICIP), Oct. 24-28, 1999, pp. 94-98, vol. 1, IEEE, Kobe, Japan.

C.A. Segall et al., A New Constraint for the Regularized Enhancement of Compressed Video, Proc. ICASSP, May 7-11, 2001, IEEE, Salt Lake City, Utah.

M.-Y. Shen et al., Fast Compression Artifact Reduction Technique Based on Nonlinear Filtering, Proc. Intl Symposium on Circuits and Systems, May 30-Jun. 2, 1999, pp. IV-179-IV-182, IEEE, Orlando, Florida.

K. Ramkishor et al., A Simple and Efficient Deblocking Algorithm for Low Bit-Rate Video Coding, Intl Symposium on Consumer Electronics 2000 (ISCE 2000), Dec. 5-7, 2000, IEEE, Hong Kong.

K.-N. Park et al., Blocking Artifact Reduction in Block-Coded Image Using Interpolation and SAF Based on Edge Map, Proc. Intl Technical Conf. on Circuits/Systems, Computers and Communications (ITC-CSCC), Jul. 16-19, 2002, IEICE, Phuket, Thailand.

Y. Hwang et al., Post-Processing for Reducing Blocking Artifacts Using Adaptive Low Pass Filtering, Proc. ITC-CSCC 2002, Jul. 2002, pp. 297-300, IEICE, Phuket, Thailand.

H.-S. Kong et al., Edge Map Guided Adaptive Post-Filter for Blocking and Ringing Artifacts Removal, TR-2004-003, Feb. 2004, Mitsubishi Electric Research Labs., Inc., Cambridge, Massachusetts.

* cited by examiner

Reference Filter     Input Weight = 1     Adaptive Filter

Reference Filter * 0.5     Input Weight = 1     Adaptive Filter

\# inner block pixel

\+ outer boundary pixel

Reference Filter * −1  +  Input Weight = 1  =  Adaptive Filter

Reference Filter * −0.5  +  Input Weight = 1  =  Adaptive Filter

ADAPTIVE FILTER

This application is a continuation-in-part of U.S. patent application Ser. No. 11/022,064 filed on Dec. 22, 2004 now abandoned, the contents of which are incorporated here by reference.

BACKGROUND

This application relates to digital image processing methods and apparatus, and more particularly to adaptive filtering methods and apparatus.

Block-based image and video coding as in current coding standards, such as JPEG, H.261, H.263, MPEG4 and H.264/AVC, divide an image to be encoded into horizontal rows and vertical columns of non-overlapping blocks of pixels, as illustrated by FIG. 1. The blocks are typically square, having dimensions of 8 pixels×8 pixels. A color image is often separated into a luminance (Y) channel that represents brightness information in the image and two chrominance (U, V) channels that represent color information in the image. The image is then represented by luminance blocks and, depending on the image's chrominance format, a number of chrominance blocks. Each block is encoded by a transform, e.g., the discrete cosine transform (DCT), and each transformed block is quantized according to a quantization parameter (QP).

Quantization can result in visually annoying artifacts, especially for video coding at low bit-rates relative to the video resolution, such as 32 kilobits per second (kbps) and 64 kbps for common intermediate format (CIF) and quarter CIF (QCIF) resolutions, which are used today for video clips, video conferences, etc. displayed on mobile communication devices and other devices having limited computational and display resources and/or communicating on channels having limited bandwidth. Two common artifacts produced by the quantization of the DCT are blocking and ringing artifacts. The blocking artifact is seen as an unnatural discontinuity between pixel values of neighboring blocks. The ringing artifact is seen as high-frequency irregularities around edges of objects in an image.

Many image processing methods to reduce blocking and ringing have been suggested. An older review is M.-Y. Shen and C.-C. J. Kuo, "Review of Postprocessing Techniques for Compression Artifact Removal", *J. Visual Communication and Image Representation*, Vol. 9, No. 1, pp. 2–14 (March 1998).

To reduce blocking artifacts, two-dimensional (2D) low-pass filtering of pixels on block boundaries of the decoded image(s) was suggested in H. C. Reeve III and Jae S. Lim, "Reduction of Blocking Effect in Image Coding", *Proc. ICASSP*, pp. 1212–1215, Boston, Mass. (1983). The 2D space-invariant static filtering described in that Reeve paper reduces blocking artifacts but can also introduce blurring artifacts when true edges in the image are filtered.

To avoid blurring of true edges in the image and also to be computationally efficient, the amount of digital low-pass filtering may be controlled by table-lookup as described in U.S. Pat. No. 5,488,420 to G. Bjontegaard for "Cosmetics Filter for Smoothing Regenerated Pictures, e.g. after Signal Compressing for Transmission in a Narrowband Network". Large differences between initial pixel values and filtered pixel values are seen as natural image structure, and thus filtering is weak so that the image is not blurred. Small pixel differences are seen as coding artifacts, and thus stronger filtering is allowed to remove the artifacts. Based on data from other equipment, the amount of filtering can be controlled by using additional filter tables. This patent modifies the output of a low-pass-filtered signal with the output of a table-lookup using the difference between a delayed input signal and the filtered signal as an index into the table, and different degrees of filtering are achieved only by providing additional tables.

To adapt the amount of filtering according to the DCT quantization, the QP from an H.261 decoder has been used as described in U.S. Pat. No. 5,367,385 to X. Yuan for "Method and Apparatus for Processing Block Coded Image Data to Reduce Boundary Artifacts between Adjacent Image Blocks". The QP scales the amount of low-pass versus all-pass filtering performed, thereby allowing stronger low-pass filtering for larger quantization. This patent selects low-pass and all-pass filter coefficients to reduce the differences in pixel values between boundary pixels of neighboring blocks, and the selection is determined by intra/inter-block encoding, the number of non-zero a.c. coefficients in the DCT, output pixel position in the block, and the direction of image gradient along the block boundary. The QP is used to weight the relative parts of the low-pass and all-pass filter responses in the filter output.

A combined de-blocking and de-ringing filter was proposed in ITU-T Recommendation H.263 Appendix III: Examples for H.263 Encoder/Decoder Implementations (June 2000). The proposed filter used filter strengths on block boundaries that were different from filter strengths inside blocks, allowing for stronger filtering at block boundaries than inside blocks. This was achieved by using a metric that used different constants when computing the output values of block boundary pixels versus the output values of pixels inside the block boundary. The metric also included the QP.

These and most other current algorithms handle de-blocking and de-ringing artifacts separately. This requires filtering in two steps to handle both artifacts, e.g., first process a decoded image with a de-blocking filter to remove artifacts on block boundaries, and then apply a de-ringing filter to remove ringing artifacts. Such double filtering can have a negative impact on computational complexity and memory consumption, which are parameters of particular importance in many devices, such as mobile communication devices.

Moreover, removal of blocking and ringing artifacts can add visually annoying blurring artifacts as described above. It is thus important to be careful with strong image features that likely are natural image features and not coding artifacts.

An adaptive non-linear filter can also be configured to increase sharpness of true image details, limit overshoots near sharp edges, and attenuate coding artifacts, as described in G. Scognamiglio et al., "Enhancement of Coded Video Sequences via an Adaptive Nonlinear Post-processing", Signal Processing: Image Communication, vol. 18, no. 2, pp. 127–139, Elsevier B.V. (February 2003). A non-separable, two-dimensional, 5-tap filter is controlled by rational functions, one in the horizontal direction and one in the vertical direction. The rational functions are adapted based on measures of local variance and blockiness and ringing.

Most current algorithms consider sharpening separately from de-blocking/de-ringing. This can adversely impact computational complexity and memory consumption. In addition, increasing the sharpness of an image can add visually annoying noise and/or coding artifacts. Thus when sharpening, it is important to be careful with weak image features that can be coding artifacts or noise and not natural image features. In addition, a sharpening filter should have low complexity and low memory consumption, facilitating its use in resource-constrained environments, such as portable devices like mobile terminals.

SUMMARY

In accordance with one aspect of the invention described in this application, an apparatus for adaptively filtering an input stream of data values includes a delay element that receives the input stream and generates a delayed stream; a filter having coefficients that determine a filter function; a combiner that receives the delayed stream and the filtered stream and generates an output stream of filtered data values; and a weight generator, in communication with the filter, that generates weight coefficients that selectively modify the coefficients of the filter. The filter receives the input stream and generates a filtered stream according to the filter function. The weight generator includes an address generator that generates addresses based on the filtered stream, and at least one table of modifying weight coefficients. Addresses produced by the address generator correspond to respective sets of modifying weight coefficients, and the sets of modifying weight coefficients are arranged in a predetermined relationship with the addresses. The coefficients of the filter are modified by sets of modifying weight coefficients corresponding to addresses such that the apparatus adaptively filters the input stream of data values.

In accordance with another aspect of the invention, a method of adaptively filtering an input group of values includes the steps of delaying the input group; filtering the input group according to a reference filter function determined by a set of filter coefficients, thereby generating a filtered input group of values; combining the delayed input group and the filtered group, thereby producing an output group of values; generating weight coefficients based on the filtered input group; modifying the set of coefficients according to the generated weight values; and filtering the input group according to a modified reference filter function determined by the modified set of filter coefficients. The step of generating weight coefficients includes generating an address based on the filtered input group, and retrieving, from at least one table, the weight coefficients. The address corresponds to a respective set of weight coefficients; sets of weight coefficients are arranged in a predetermined relationship with the addresses; and the set of filter coefficients is modified by the retrieved set of weight coefficients.

In accordance with yet another aspect of the invention, a computer-readable medium contains a computer program for adaptively filtering an input group of values. The computer program performs the steps of delaying the input group; filtering the input group according to a reference filter function determined by a set of filter coefficients, thereby generating a filtered input group of values; combining the delayed input group and the filtered group, thereby producing an output group of values; generating weight coefficients based on the filtered input group; modifying the set of filter coefficients according to the generated weight values; and filtering the input group according to a modified reference filter function determined by the modified set of filter coefficients. The step of generating weight coefficients includes generating an address based on the filtered input group, and retrieving, from at least one table, the weight coefficients. The address corresponds to a respective set of weight coefficients; sets of weight coefficients are arranged in a predetermined relationship with the addresses; and the set of filter coefficients is modified by the retrieved set of weight coefficients.

BRIEF DESCRIPTION OF THE DRAWINGS

The various features, objects, and advantages of the invention will be understood by reading this description in conjunction with the drawings, in which.

DETAILED DESCRIPTION

This application describes an adaptive filter that, in one embodiment, filters rows of pixels of an image in a vertical direction, stores the results in row vectors, and then filters the row vectors in the horizontal direction, and displays the results. In some cases, the results could be stored for later display. Coefficients of a reference filter are modified based on the output from the reference filter through a table-lookup process that accesses a table of modifying weight coefficients. The output of the modified filter is added to a delayed version of the input to provide the adaptive filter output.

Figure 1:
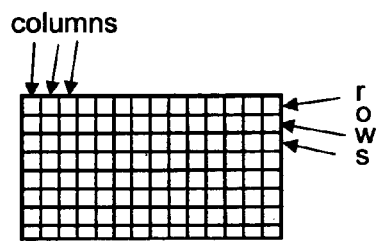
FIG. 1 depicts blocks of pixels in an image.
Figure 2:
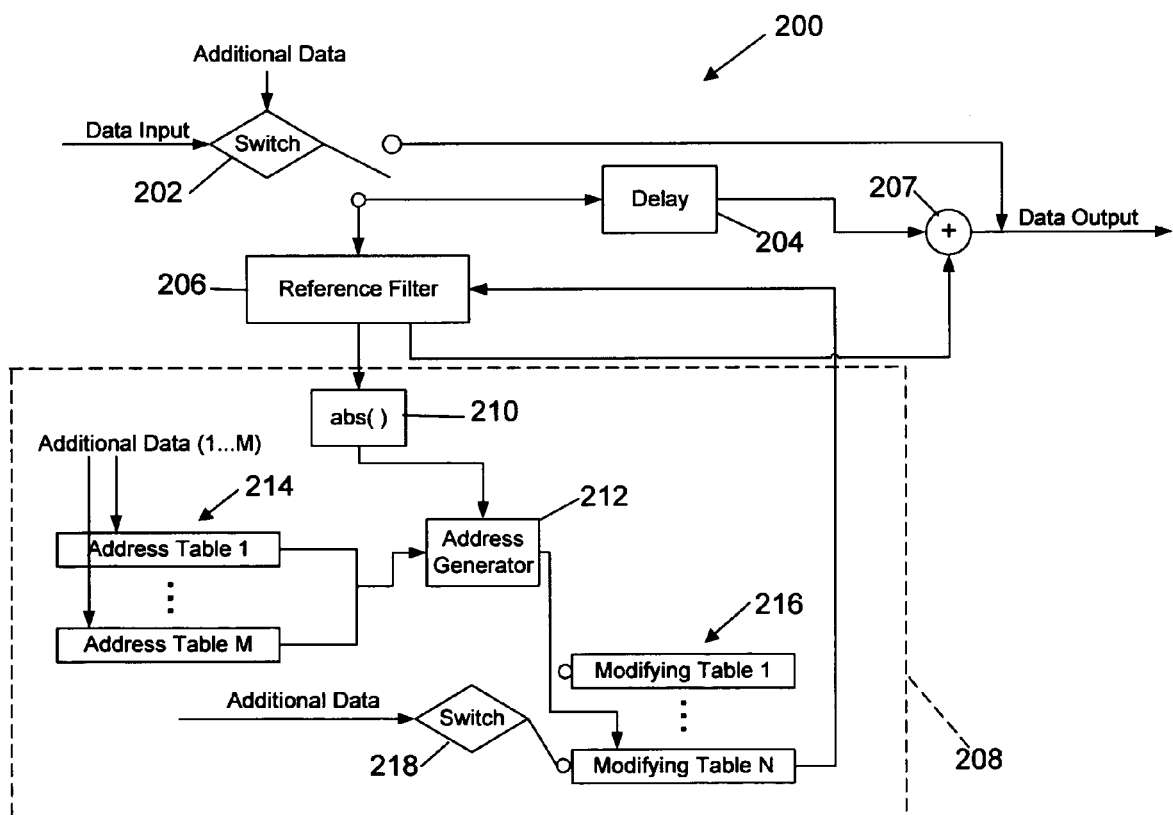
FIG. 2 is a block diagram of an adaptive filter.

FIG. 2 is a block diagram of an adaptive filter 200. An input stream of pixel data is provided to a switch 202 that directs the input pixels to either the output of the filter or to a delay element 204 and a reference filter 206. The operation of the switch 202 is responsive to additional data, in particular, whether the input pixels belong to an error-concealed block or another selected feature, as described in more detail below. The filter 206 is preferably a digital filter, which has coefficients that determine the filtering function, and these coefficients are selectively modified as described in more detail below. The filtered output of the reference filter 206 is provided to an adder 207 that combines the output with the delayed input that is produced by the delay element 204, thereby generating the output of the adaptive filter 200.

The output of the reference filter 206 is also provided to a weight generator 208 that produces weights that selectively modify the coefficients of the filter 206 based on the filter output. An optional element 210 produces a signal corresponding to the absolute value of the filter output, and the absolute value signal is provided to an address generator 212, which advantageously uses the absolute value, either by itself or together with additional data provided by one or more suitable address tables 214, to generate addresses into one or more tables 216 of modifying weight coefficients. It should be understood that it is not necessary to use the absolute value to generate addresses, although doing so has the possible advantage of decreasing the address range; the reference filter output can be used (with suitable conditioning to deal with possible negative values, if necessary), either by itself or with additional data, to generate addresses. If more than one table 216 is provided, the additional data advantageously causes the generator 212 to select preferred ones of the tables 216 through operation of suitable switch 218. As a set of modifying weight coefficients is retrieved from the selected table 216, it is provided by the weight generator 208 to the filter 206, and the transfer function of the reference filter 206 is modified accordingly. Through this modification, the filter 200 adapts to the input stream of pixels.

Each table 216 is preferably configured such that each address provided by the generator 212 retrieves a respective set of modifying weight coefficients. For the arrangement depicted in FIG. 2, the sets of modifying weight coefficients are preferably stored in each table 216 such that increasing index (address) corresponds to weaker filtering by the filter 206. Weaker filtering for increasing index is natural where larger filter outputs are more likely to be image edges than to be coding errors (blocking artifacts). The length (i.e., address range) of each table 216 corresponds to the range of the output of the reference filter 206. If different modifications are to be performed for different reference filter coefficients, at least one scaling factor (or modifying weight coefficient) is needed for each reference filter coefficient. The address generator 212 may check the validity of addresses generated by, for example, confirming that an address is inside the range of the table, when the length of the modifying filter table is less that the range of the filter output, etc.

Figure 3A:
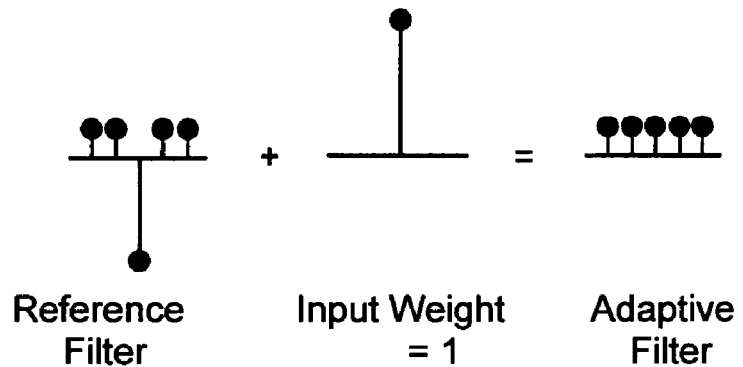
FIGS. 3A, 3B depict reference filter modification and a low-pass adaptive filter response.
Figure 3B:
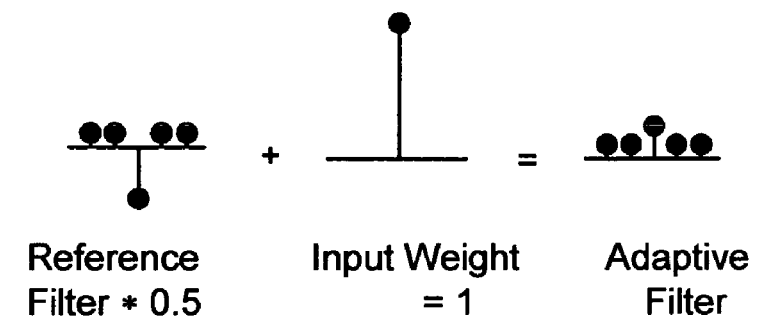

FIGS. 3A, 3B depict how modification of the coefficients of a 5-tap reference filter 206 with a set of modifying weights modifies the adaptive filter response. In the case illustrated by the figures, the same modification is made to each coefficient. In the figures, the sign and magnitude of a filter coefficient or a weight are indicated by the length of the respective vertical line segment and its position above or below the horizontal reference line. The "+" sign indicates the operation of the adder 207. In FIG. 3B, the modifying weight is shown as 0.5 and the other coefficients are fixed. Comparing FIG. 3A and FIG. 3B, it will be seen that a "weaker" adaptive filter 200 is achieved when the reference filter coefficients are scaled by a factor of 0.5, i.e., neighboring pixels have less influence on the modified-filter output for a pixel.

The sets of modifying weight coefficients in the tables 216 modify the transfer function of the reference filter 206, resulting in a modified, or adapted, transfer function for the filter 200. In a fixed-point implementation, which is particularly useful for relatively simple processors, this modification can be conveniently realized through multiplication and shift, and thus each coefficient has two modifying factors. For example, multiplication by 0.5 can be performed by multiplying by 1 and down-shifting by 1, i.e., $1*2^{(-1)}=0.5$. If the modifying weights are such that all filter coefficients are modified in the same way (see, e.g., FIG. 3B), the output of the modified reference filter 206 is simply a scaling of the output of the unmodified reference filter. Otherwise, the output of the modified reference filter is calculated using the input pixels and the modified reference filter transfer function.

As noted above, the shape of the transfer function of the reference filter 206 can be modified based on additional data, which may be provided from one or more address tables 214. Exemplary additional data are the position of the output pixel within a block and the QP for the block. As depicted in FIG. 2, additional data retrieved from the one or more tables 214 modifies the index used for table lookup in the one or more tables 216. The transfer function of the reference filter 206 can also or instead be modified by providing additional sets of weight coefficients in the tables 216 or by modifying such sets, for example by scaling the modification weight coefficients in a set or sets by adding suitable values that may be conveniently stored in an adjustment table selected by a user or application.

The length of a table 214 should correspond to the range of the used additional data. For example, let the QP be additional data with a range 0 to 31. The output of the table 214 may then be positive for low QP values and negative for high QP values, resulting in potentially weaker and stronger filtering, respectively, depending on the absolute value of the reference filter output. It should be noted that table 214 is one way to adapt the filtering based on the QP, and use of table(s) 214 is optional. It should also be noted that several tables 214 can be used, and thus several additional data can be provided to the address generator 212.

The length (i.e., the address range) of a table 216 should correspond to the range of the reference filter output. If different modifications are performed for each filter coefficient, a weight factor for each coefficient is needed. In a fixed point implementation, reference filter coefficients can be weighted by scaling through multiplication and shift, and thus each coefficient needs two modifying factors. For example, let the reference filter have five taps and let the filter be subject to uniform modification. Small address values then give scaling factors close to ⅕ and large address values give scaling factors close to zero. The result is thus variation from flat low-pass filtering to very small low-pass filtering over the filter output range.

Using as additional data the position of the output pixel within a block is advantageous in that less weight can be given for neighboring pixel values for output positions closer to the center of the block. This tends to preserve the central parts of the block, which typically have less prominent coding artifacts. Using the QP as additional data is also advantageous in that less weight can be given for neighboring pixel values when the QP is small, e.g., when coding artifacts also are likely to be less prominent. Larger quantization values are given more weight for neighboring pixel values, e.g., when coding artifacts also are likely to be larger.

Figure 4:
FIG. 4 depicts a row of pixels.

The set of weight coefficients retrieved, i.e., the selected table 216, is based on the position of a pixel in its block. As indicated by FIG. 4, which depicts a row of pixels in a block, outer boundary pixels (indicated by + in the figure) select a table that corresponds to stronger filtering than the table selected for inner block pixels. Furthermore, the weights of the selected table for inner pixels (indicated by # in FIG. 4) should decrease more quickly with increasing index than the weights in the boundary pixels table. This results in reduction of blocking and ringing artifacts without blurring the image too much.

The QP may be used to modify the index for lookup within the table 216 through another table lookup. For example, the QP can be used as an index into the additional data table(s) 214, which should then constructed such that a lower QP results in a weaker filter and a larger QP results in a stronger filter than the reference filter.

It is currently believed that the set of filter coefficients described here is most useful because the resulting filter is a maximum flat low-pass filter and enables low-complexity filter computations. The number of filter taps chosen is the result of a trade-off between the amount of low-pass filtering that can be performed, locality in filtering, and computational complexity. Similar filters may be used for filtering luminance and chrominance blocks, although luminance blocks are more important to filter than chrominance blocks.

It will be appreciated that the arrangement depicted in FIG. 2 can advantageously filter skipped blocks based on the QP from when the block last was encoded rather than the current QP from decoding. Using the current QP from decoding can result in unnecessarily strong or weak filtering. Thus, previous QP values need to be stored, and this can be done in any convenient way. In addition, error-concealed blocks need not be filtered at all and should not be used for filtering error-free blocks. Error-concealed blocks have probably already been interpolated from neighboring error-free blocks, and thus they already have continuous variation of pixel values across block borders. This reduces computational complexity without affecting visual performance since error-concealed blocks normally do not contain any discontinuities in pixel values at block boundaries. So for this case, the additional data is an indication of whether a block is error-concealed or not that is provided to the switch 202, and the switch 202 operates as an on/off switch of the filtering. In general, the switch 202 is operate selectively such that only selected pixels and/or blocks are filtered.

Figure 5A:
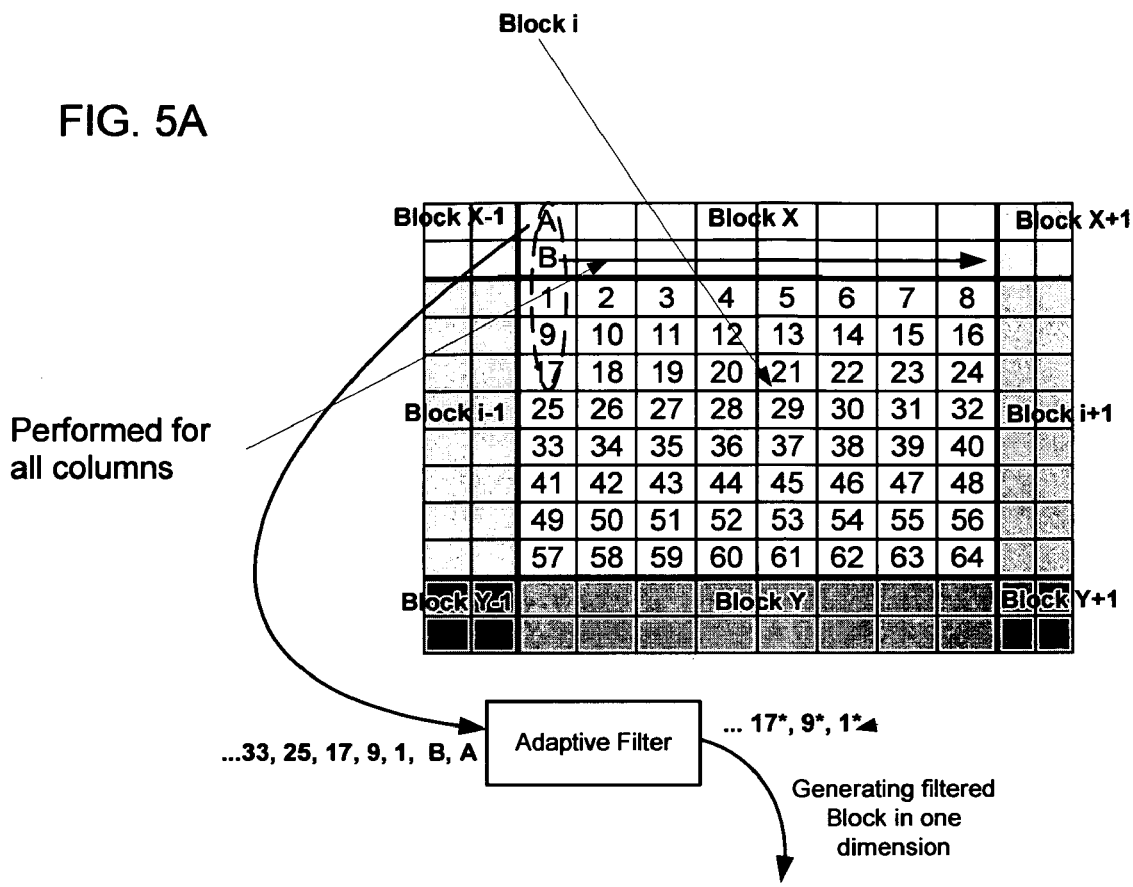
FIGS. 5A, 5B illustrate adaptive filtering of a block of pixels.
Figure 5B:
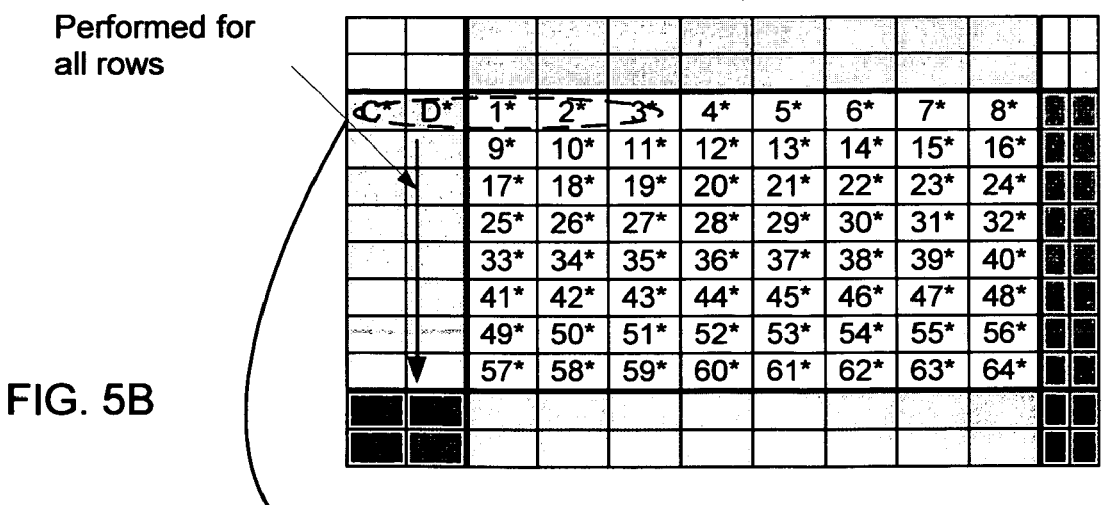

FIGS. 5A, 5B illustrate operation of an adaptive filter 200 on a block i of pixels. As depicted, the block i is one of several blocks, with only portions of neighboring blocks X−1, X, X+1, i−1, i+1, Y−1, Y, and Y+1 indicated in the figures. As described above, the block i includes eight rows and eight columns of pixels, each of which is identified by a respective number from 1–64. Filtering of the block begins by loading a first group of pixel values into the reference filter 206 to produce a filter output for the first pixel, and it will be understood that the size of the group corresponds to the order of the filter. Referring to FIG. 5A, a column-wise group of five pixels A, B, 1, 9, 17, indicated by the dashed lines, is loaded into a 5-tap filter that produces a filter output value upon modification of the filter coefficients by the weight coefficients as described above. The filter output is added to the corresponding input pixel, thereby generating the adaptive filter output 1*. The adaptive filter output value for the next pixel in the column (in this example, 9*) is produced by loading or shifting the first value (in this example, pixel A) out and the next value (in this example, pixel 25) in to the filter 206. This process continues for the rest of the pixels in the column, and thus a sequence of pixel values A, B, 1, 9, 17, 25, 33, . . . is clocked into the filter 206 as a sequence of filtered values 1*, 9*, . . . , 49*, 57* is clocked out of the adaptive filter 200. This process is also repeated for each column in the block being filtered, with the result that the block is filtered in one dimension. In this example, that one dimension is the column dimension, but it will be appreciated that row-wise filtering may be carried out before column-wise filtering. It will also be appreciated that the filter 206 can be 2-dimensional, extending to neighboring columns. Two-dimensional filtering, by including neighboring rows and columns more weakly, can yield more reliable estimations across block borders.

The column-wise-filtered block is then filtered row-wise in a similar way. It should be noted that the earliest time row-wise filtering can start is after the number of output values in one row equals the filter length. A first group of pixel values indicated by the dashed lines is loaded into the reference filter 206 to produce a filter output for the first pixel. Referring to FIG. 5B, a row-wise group of five pixels C*, D*, 1*, 2*, 3* is loaded into the 5-tap filter that produces a filter output value upon modification of the filter coefficients by the weight coefficients as described above. The filter output is added to the corresponding input pixel, thereby generating the adaptive filter output f1. The adaptive filter output value for the next pixel in the row (in this example, f2) is produced by loading or shifting the first value (in this example, pixel C*) out and the next value (in this example, pixel 4*) in to the filter 206. This process continues for the rest of the pixels in the row, and thus a sequence of filtered pixel values C*, D*, 1*, 2*, 3*, 4*, . . . is clocked into the filter 206 as a sequence of filtered values f1, f2, . . . , f7, f8 is clocked out of the filter 200. This process is also repeated for each row in the block being filtered, with the result that the block is filtered in the other dimension and a complete filtered block is generated. In this example, that other dimension is the row dimension, but it will be appreciated that column-wise filtering may be carried out after row-wise filtering. It will also be appreciated that the filter 206 can be 2-dimensional, extending to neighboring rows.

Figure 6:
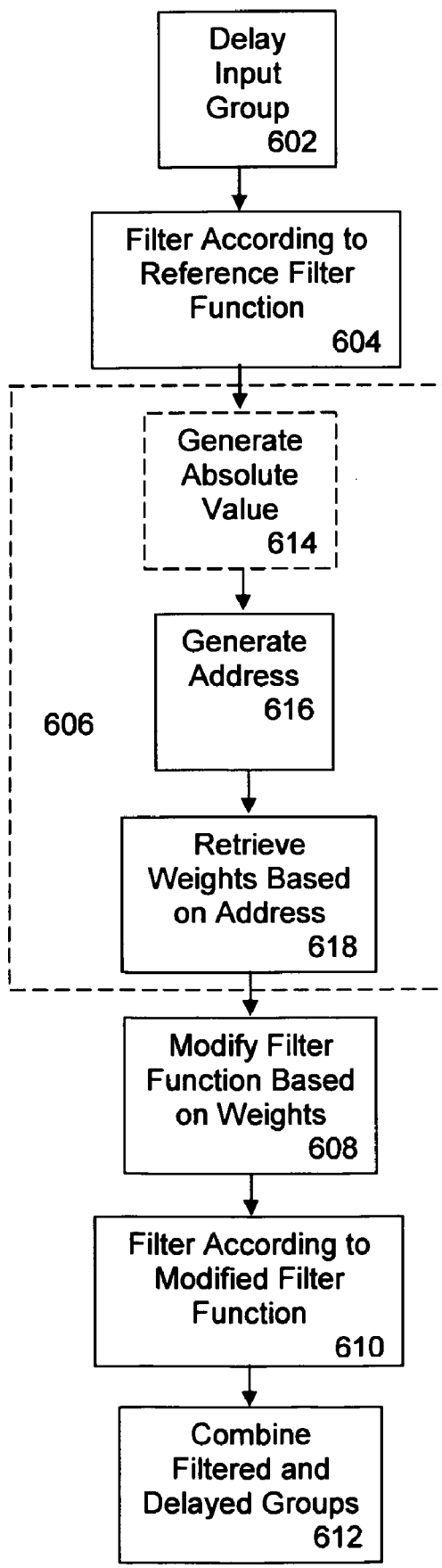
FIG. 6 is a flow chart of an adaptive filtering method.

FIG. 6 is a flow chart of a method of adaptively filtering an input group of values, such as a block of pixels. In step 602, the input group is delayed, and in step 604, the input group is filtered according to a reference filter function. As described above, the reference filter function is determined by a set of filter coefficients. In step 606, weight coefficients are generated based on the filtered input group, and the set of filter coefficients is modified according to the generated weight values in step 608. The input group of values is then filtered according to a modified reference filter function determined by the modified set of filter coefficients in step 610. The result of this filtering is a filtered input group of values that is combined (step 612) with the delayed input group, thereby producing a group of values that is the output of the filtering method.

As described above, the step of generating weight coefficients may, but need not, include the steps of generating an absolute value signal that corresponds to the absolute value of the filtered input group (step 614). It also includes the step of generating an address based at least on the absolute value signal, if included, or on the filtered input group (step 616), and the step of retrieving, from at least one table, the weight coefficients (step 618). The address corresponds to a respective set of weight coefficients, and sets of weight coefficients are arranged in a predetermined relationship with the addresses. The set of filter coefficients is modified by the retrieved set of weight coefficients.

The embodiments of the invention described here reduce local image structure, e.g., blocking and ringing artifacts, by reducing the differences between neighboring pixel values. To limit the reduction of natural local image structure, the filter shape is modified to give less weight to neighboring pixels when the filter output is large or according to additional data. The modification of the filter shape can be performed by table-lookup, which provides a low-complexity solution that lends itself to portable devices and the like. If the modifications of the filter shape are uniform, the modifications can be performed by scaling the filter output.

Applications requiring both encoding and decoding of video, e.g., videoconference applications, can sometimes not afford to filter all pixels in an image due to limited processing power in the device. Video messaging and other off-line applications that only need video decoding can afford more complex filtering using devices having limited processing power. The adaptive filter described here can operate on all pixels in a decoded image or on only specific parts of the image, i.e., it is scalable in complexity. Thus, different filtering for different combinations of applications for a given device can be provided. For just a few of many examples, all luminance and chrominance blocks may be filtered, only luminance blocks may be filtered, only block border pixels and first neighbors may be filtered, and only block border pixels may be filtered.

As described above, an adaptive filter can remove de-blocking and de-ringing artifacts, which are commonly caused by the quantization of the DCT coefficients in currently standardized codecs, e.g., H.264, H.263, and MPEG4. Such an adaptive filter can also be used to enhance the sharpness of decoded video or images, reducing blur, which may be caused by zeroing high-frequency DCT coefficients; video/image preprocessing, such as de-noising; video/image post-processing, such as de-blocking/de-ringing; and the integration time of an image sensor, such as a charge-coupled device (CCD) or complementary metal-oxide-semiconductor (CMOS) transistor array. It can also increase the perceived sharpness of up-sampled video/images. Up-sampling may be performed when a desired display resolution is larger than the encoded video resolution.

Figure 7A:
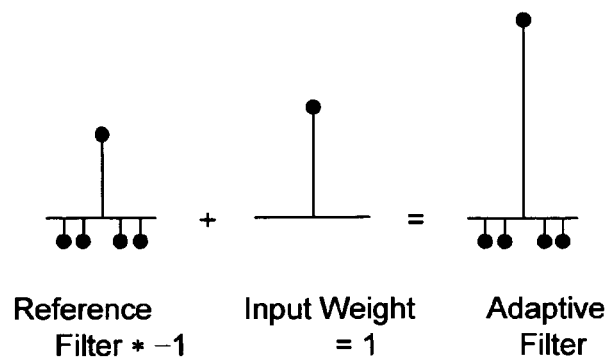
FIGS. 7A, 7B depict reference filter modification and a high-pass adaptive filter response.
Figure 7B:
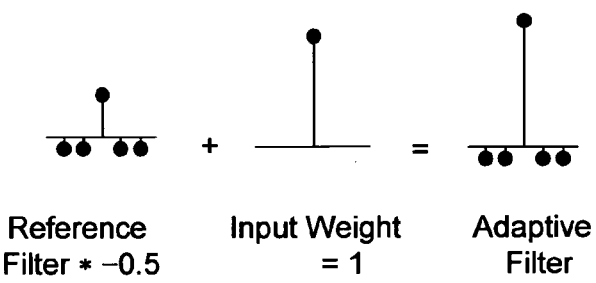

The filters and concepts described above can be used for sharpening by changing the sign of the reference filter, and an exemplary 5-tap reference filter is depicted in FIGS. 7A, 7B. Comparing those figures with FIGS. 3A, 3B, the difference between an adaptive sharpening, or high-pass, filter and an adaptive low-pass filter will be recognized. It will be understood that a 5-tap reference filter 206 can be configured to implement either filter.

As in FIGS. 3A, 3B, the FIGS. 7A, 7B depict how modification of the coefficients of a 5-tap reference filter 206 with a set of modifying weights modifies the adaptive filter response. In the case illustrated by the figures, the same modification is made to each coefficient. In the figures, the sign and magnitude of a filter coefficient or a weight are indicated by the length of the respective vertical line segment and its position above or below the horizontal reference line. The "+" sign indicates the operation of the adder 207. In FIG. 7A, the modifying weight is shown as −1 and the other coefficients are fixed. In FIG. 7B, the modifying weight is shown as −0.5 and the other coefficients are fixed. Comparing FIG. 7A and FIG. 7B, it will be seen that a "weaker" adaptive filter 200 is achieved when the reference filter coefficients are scaled by a smaller negative factor, i.e., neighboring pixels have less influence on the modified-filter output for a pixel.

From FIGS. 7A, 7B, it will be seen that the sign change of the reference filter generates a high-pass filter compared to the above-described low-pass filter. As in the low-pass filter, the sets of modifying weight coefficients in the tables 216 modify the transfer function of the reference filter 206, resulting in a modified, or adapted, transfer function for the filter 200. In a fixed-point implementation, which is particularly useful for relatively simple processors, this modification can be conveniently realized through multiplication and shift, and thus each coefficient has two modifying factors. If the modifying weights are such that all filter coefficients are modified in the same way (see, e.g., FIGS. 7A, 7B), the output of the modified reference filter 206 is simply a scaling and sign change of the output of the unmodified reference filter. Otherwise, the output of the modified reference filter is calculated using the input pixels and the modified reference filter transfer function. It will be noted that such a sign change and use of negative weights can also be implemented in the arrangement of FIG. 2 by changing the sign of the adder 207.

As described above with respect to the low-pass adaptive filter, the shape of the transfer function of the high-pass reference filter 206 can be modified based on additional data, which may be provided from one or more address tables 214. The transfer function of the reference filter 206 can also or instead be modified by providing additional sets of weight coefficients in the tables 216 or by modifying such sets, for example by scaling the modification weight coefficients in a set or sets by adding suitable values that may be conveniently stored in an adjustment table selected by a user or application.

As in the low-pass filter, the length of a table 214 should correspond to the range of the used additional data, and it should be noted that table 214 is just one way to adapt the filtering based on the QP, and use of table(s) 214 is optional. It should also be noted that several tables 214 can be used, and thus several additional data can be provided to the address generator 212. The length (i.e., the address range) of a table 216 should correspond to the range of the reference filter output. If different modifications are performed for each filter coefficient, a weight factor for each coefficient is needed. In a fixed point implementation, reference filter coefficients can be weighted by scaling through multiplication and shift, and thus each coefficient needs two modifying factors.

Stronger sharpening can be performed inside a decoded block than on the block border, which is more likely to include blocking artifacts. Sharpening can furthermore be used when the QP of a decoded macro block is low, i.e., when image features are likely to be natural, not coding noise.

The adaptive sharpening filter enhances local image structure, e.g., edges and lines, by increasing the difference between neighboring pixel values. To limit enhancement of coding artifacts or noise, the filter shape can be modified based on the filter output, giving less weight to a neighboring pixel when the filter output is small, and/or based on additional data. The modification of the filter shape can be performed by table lookup, which provides low complexity. If the modifications of the filter shape are uniform to all filter coefficients, the modifications can be performed simply by scaling the filter output.

Figure 8:
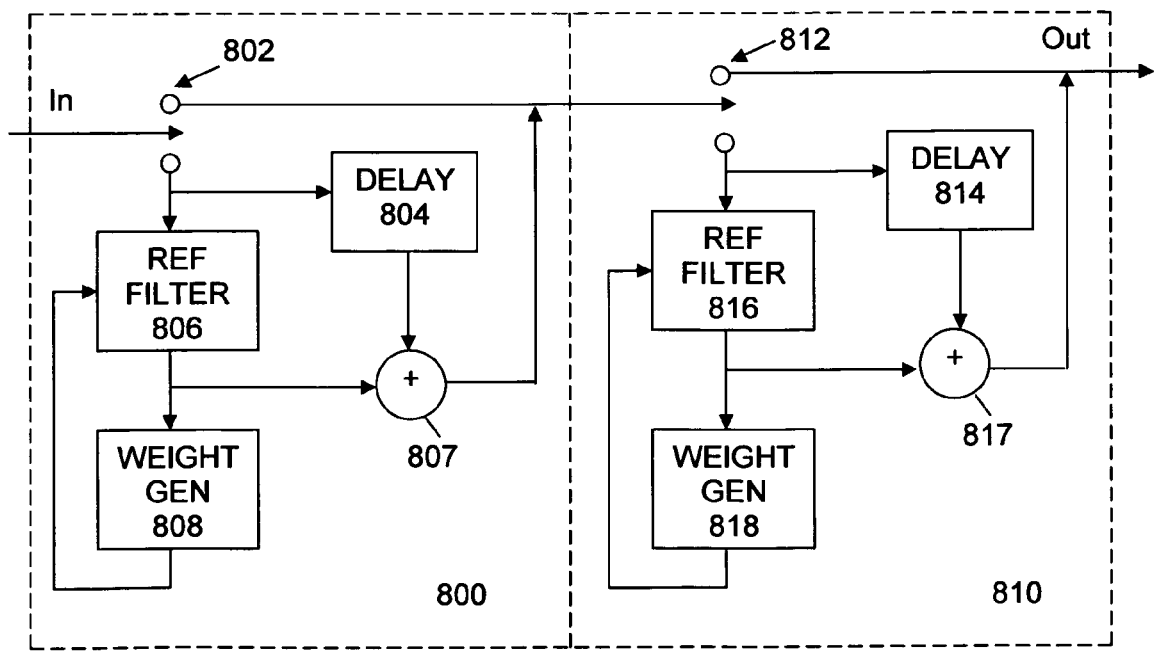
FIG. 8 is a block diagram of two adaptive filters connected in series.

Sharpening can be used simultaneously with de-blocking/de-ringing as described above or on its own, implemented by its own filter. The latter arrangement is depicted by FIG. 8, which is a block diagram of two adaptive filters 800, 810 connected in series. As in the arrangement depicted in FIG. 2, input data is switched by a first controllable switch 802 between the output of the filter 800 and inputs of a first delay element 804 and a first reference filter 806. The output of the reference filter 806 is directed to a summer 807 and a weight generator 808. The output of the summer 807 is directed to the output of the filter 800, which is the input of the filter 810. Input data for the filter 810 is switched by a second controllable switch 812 between the output of the filter 810 and inputs of a second delay element 814 and a second reference filter 816. The output of the reference filter 816 is directed to a summer 817 and a weight generator 818. The output of the summer 817 is directed to the output of the filter 810. The weight generators 808, 818 operate as described above for either low-pass or high-pass filtering.

The arrangement depicted in FIG. 2 can also be used for simultaneous sharpening and de-blocking/de-ringing. The output of the reference filter 206 is directed to the summer 207 and weight generator 208, which operates as described above for either low-pass or high-pass filtering. One of low-pass and high-pass filtering is implemented according to the chosen modifying table 216, which may be selected by the address generator 212 according to additional data provided through the switch 218. Positions in modifying tables for low-pass filtering have generally positive weights, and positions in modifying tables for high-pass filtering have generally negative weights. Thus, a modifying table can simultaneously cover both low-pass and high-pass filtering by having positive weights for low addresses and negative weights for high addresses.

For example, if the absolute value of the reference filter output is relatively large, e.g., greater than about 3 on a scale of 0 to 100, the sign of the reference filter output is changed by using a modifying table having negative weight so that high-pass filtering, or sharpening, is performed. When the absolute value of the reference filter output is relatively small, e.g., less than about 3 on that scale, the sign of the reference filter output is retained by using a modifying filter having positive weight so that low-pass filtering, or de-blocking and de-ringing, is performed.

In general, the filter characteristics can vary with the absolute value of the reference filter output by use of appropriate modifying weights, gradually changing from strong low-pass filtering (large positive weight) when the reference filter output magnitude is small, to weak low-pass filtering (small positive weight), to weak high-pass filtering (small negative weight), and to strong high-pass filtering (large negative weight) when the reference filter output magnitude is relatively larger. Weak or all-pass filtering (small negative/positive or zero weight) can be implemented when the reference filter output magnitude is large. The type of filtering (i.e., high-, low-, and all-pass) can also be shifted towards a desired type by additional data in tables 214. For example when using QP as additional data, sharpening can be favored for low QP values and de-blocking/de-ringing can be favored for high QP values.

In general, the amplitude of the output signal of the reference filter can be both positive and negative. In adaptive low-pass filter mode, output signal differences are reduced, and in adaptive high-pass filter mode, output signal differences are amplified. The absolute value of the output signal (e.g., the magnitude) determines whether the filter is low-pass or high-pass. It will be appreciated of course that all polarities can be reversed without loss of generality and that, as described above, it is not necessary to use the absolute value explicitly to generate addresses.

It will be recognized from this description that many advantages can be achieved by using the position of an output pixel in a block as additional data. More weight can be given to neighboring pixel values for output positions closer to the center of a block, thereby sharpening central parts of the block with normally less prominent coding artifacts. Block boundary pixels are not sharpened at all or only weakly sharpened to avoid amplifying block artifacts.

Other advantages can be achieved by using the quantization parameter as additional data. More weight can be given to neighboring pixel values when the quantization parameter is small, e.g., when coding artifacts also are likely to be less prominent. Larger quantization values can be given less weight for neighboring pixel values, e.g., when coding artifacts also are likely to be larger. For large quantization parameters, the sign of the reference filter output can be retained to perform de-blocking.

In comparison with previous adaptive non-linear post filters, the adaptive filters described here can use the filter output to control the filter function, which requires much less computation than an adaptive non-linear filter that uses a rational function to control the filter function based on measures of variance.

It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. An apparatus for adaptively filtering an input stream of data values, comprising:
    a delay element that receives the input stream and generates a delayed stream;
    a filter having coefficients that determine a filter function, wherein the filter receives the input stream and generates a filtered stream according to the filter function;
    a combiner that receives the delayed stream and the filtered stream and generates an output stream of filtered data values;
    a weight generator, in communication with the filter, that generates weight coefficients that selectively modify the coefficients of the filter, wherein the weight generator includes:
    an address generator that generates addresses based on the filtered stream; and
    at least one table of modifying weight coefficients, wherein addresses produced by the address generator correspond to respective sets of modifying weight coefficients, and the sets of modifying weight coefficients are arranged in a predetermined relationship with the addresses;
    wherein the coefficients of the filter are modified by sets of modifying weight coefficients corresponding to addresses such that the apparatus adaptively filters the input stream of data values.

2. The apparatus of claim 1, wherein the weight generator includes an absolute value generator that produces a signal corresponding to an absolute value of the filtered stream, and the addresses are generated based on the signal corresponding to the absolute value of the filtered stream.

3. The apparatus of claim 2, wherein the address generator generates addresses based on combinations of the signal corresponding to the absolute value of the filtered stream and additional data.

4. The apparatus of claim 1, wherein the address generator generates addresses based on combinations of the filtered stream and additional data.

5. The apparatus of claim 4, wherein the address generator accesses the additional data in at least one table.

6. The apparatus of claim 4, wherein quantization parameters correspond to addresses generated by the address generator, additional data is provided to the address generator according to the quantization parameters and is arranged such that a low quantization parameter corresponds to one of weaker filtering and stronger filtering and a large quantization parameter corresponds to the other one of weaker filtering and stronger filtering.

7. The apparatus of claim 4, wherein quantization parameters correspond to addresses generated by the address generator, additional data is provided to the address generator according to the quantization parameters, and sets of modifying weight coefficients are arranged such that the apparatus adaptively either low-pass filters or all-pass filters the input stream when an absolute value of the filtered stream is small and either all-pass filters or high-pass filters the input stream when the absolute value of the filtered stream is large.

8. The apparatus of claim 4, wherein the input stream is a stream of pixel values, and additional data includes at least one of a position of a pixel within a block of pixels and a quantization parameter.

9. The apparatus of claim 1, wherein the address generator selects a table of modifying weight coefficients based on additional data.

10. The apparatus of claim 9, wherein the input stream is a stream of pixel values, and pixel position is additional data.

11. The apparatus of claim 10, wherein a table of modifying weight coefficients selected based on pixels having positions at borders of a block of pixels results in one of weaker filtering and stronger filtering than a table of modifying weight coefficients selected based on pixels having inner positions in the block.

12. The apparatus of claim 10, wherein a table of modifying weight coefficients selected based on pixels having positions at borders of a block of pixels results in stronger low-pass filtering than a table of modifying weight coefficients selected based on pixels having inner positions in the block.

13. The apparatus of claim 10, wherein a table of modifying weight coefficients selected based on pixels having positions at borders of a block of pixels results in weaker high-pass filtering than a table of modifying weight coefficients selected based on pixels having inner positions in the block.

14. The apparatus of claim 1, wherein the predetermined relationship is such that a smaller address corresponds to one of weaker filtering and stronger filtering by the filter and a larger address corresponds to the other one of weaker filtering and stronger filtering by the filter.

15. The apparatus of claim 1, wherein the input stream is a stream of pixel values that are arranged in blocks of pixels and that includes one of the following regions: only block border pixels of luminance blocks, block border pixels and first neighbors of luminance blocks, only pixels having inner positions in luminance blocks, all pixels in luminance blocks, and all pixels in luminance and chrominance blocks.

16. The apparatus of claim 1, wherein the at least one table of modifying weight coefficients includes modifying weight coefficients that are combined with values from a selected adjustment table.

17. The apparatus of claim 1, further comprising a switch, wherein the input stream is a stream of pixel values that are arranged in blocks of pixels and the switch selectively directs error-concealed blocks as the output stream.

18. The apparatus of claim 1, wherein the coefficients of the filter are modified by sets of modifying weight coefficients corresponding to addresses and the modifying weight coefficients are arranged such that the apparatus adaptively either low-pass filters or all-pass filters the input stream when an absolute value of the filtered stream is small and either all-pass filters or high-pass filters the input stream when the absolute value of the filtered stream is large.

19. A method of adaptively filtering an input group of values, comprising the steps of:
    delaying the input group;
    filtering the input group according to a reference filter function determined by a set of filter coefficients, thereby generating a filtered input group of values;
    combining the delayed input group and the filtered group, thereby producing an output group of values;
    generating weight coefficients based on the filtered input group;
    modifying the set of filter coefficients according to the generated weight values; and
    filtering the input group according to a modified reference filter function determined by the modified set of filter coefficients;
    wherein the step of generating weight coefficients includes:
        generating an address based on the filtered input group; and
        retrieving, from at least one table, the weight coefficients; and
    the address corresponds to a respective set of weight coefficients; sets of weight coefficients are arranged in a predetermined relationship with the addresses; and the set of filter coefficients is modified by the retrieved set of weight coefficients.

20. The method of claim 19, wherein the step of generating weight coefficients further includes generating an absolute value signal that corresponds to the absolute value of the filtered input group, and the address is generated based on the absolute value signal.

21. The method of claim 20, wherein the address is generated based on a combination of the absolute value signal and additional data.

22. The method of claim 19, wherein the address is generated based on a combination of the filtered input group and additional data.

23. The method of claim 22, wherein the address is generated by accessing the additional data in at least one table.

24. The method of claim 22, wherein the additional data includes a quantization parameter, and the generated address retrieves weight coefficients such that a low quantization parameter corresponds to one of weaker filtering and stronger filtering and a large quantization parameter corresponds to the other one of weaker filtering and stronger filtering.

25. The method of claim 22, wherein additional data includes a quantization parameter, and the generated address retrieves weight coefficients arranged such that the input group is adaptively either low-pass filtered or all-pass filtered when an absolute value of the filtered input is small and either all-pass filtered or high-pass filtered when the absolute value of the filtered input is large.

26. The method of claim 22, wherein the input group is a block of pixel values, and the additional data includes at least one of a position of a pixel within the block and a quantization parameter.

27. The method of claim 19, wherein a table of weight coefficients is selected according to the additional data.

28. The method of claim 27, wherein the input group is a block of pixel values, and pixel position in the block is additional data.

29. The method of claim 28, wherein a table of weight coefficients selected according to a pixel having a position at a border of the block results in one of weaker filtering and stronger filtering than a table of weight coefficients selected according to a pixel having an inner position in the block.

30. The method of claim 28, wherein a table of weight coefficients selected according to a pixel having a position at a border of the block results in stronger low-pass filtering than a table of weight coefficients selected according to a pixel having an inner position in the block.

31. The method of claim 28, wherein a table of weight coefficients selected according to a pixel having a position at a border of the block results in weaker high-pass filtering than a table of weight coefficients selected according to a pixel having an inner position in the block.

32. The method of claim 19, wherein the predetermined relationship is such that a smaller address corresponds to one or weaker filtering and stronger filtering and a larger address corresponds to the other one of weaker filtering and stronger filtering.

33. The method of claim 19, wherein the input group is a block of pixel values that includes one of the following regions: only block border pixels of luminance blocks, block border pixels and first neighbors of luminance blocks, only pixels having inner positions in luminance blocks, all pixels in luminance blocks, and all pixels in luminance and chrominance blocks.

34. The method of claim 19, wherein the at least one table of weight coefficients includes weights that are combined with values from a selected adjustment table.

35. The method of claim 19, wherein the input group is a block of error-concealed pixel values, and the method includes the step of directing the error-concealed block as the output group.

36. The method of claim 19, wherein the generated address retrieves weight coefficients arranged such that the input group is adaptively either low-pass filtered or all-pass filtered when an absolute value of the filtered input is small and either all-pass filtered or high-pass filtered when the absolute value of the filtered input is large.

37. The method of claim 19, wherein the input group is a block arranged in two orthogonal directions, and the block is adaptively filtered in a first one of the directions, thereby producing a first output group, and the first output group is adaptively filtered in a second one of the directions.

38. The method of claim 37, wherein the filtering is one-dimensional.

39. The method of claim 37, wherein the filtering is two-dimensional.

40. A computer-readable medium containing a computer program for adaptively filtering an input group of values, wherein the computer program performs the steps of:
delaying the input group;
filtering the input group according to a reference filter function determined by a set of filter coefficients, thereby generating a filtered input group of values;
combining the delayed input group and the filtered group, thereby producing an output group of values;
generating weight coefficients based on the filtered input group;
modifying the set of filter coefficients according to the generated weight values; and
filtering the input group according to a modified reference filter function determined by the modified set of filter coefficients;
wherein the step of generating weight coefficients includes:
generating an address based on the filtered input group; and
retrieving, from at least one table, the weight coefficients; and the address corresponds to a respective set of weight coefficients; sets of weight coefficients are arranged in a predetermined relationship with the addresses; and the set of filter coefficients is modified by the retrieved set of weight coefficients.

41. The computer-readable medium of claim 40, wherein generating weight coefficients further includes generating an absolute value signal that corresponds to the absolute value of the filtered input group, and the address is generated based on the absolute value signal.

42. The computer-readable medium of claim 41, wherein the address is generated based on a combination of the absolute value signal and additional data.

43. The computer-readable medium of claim 40, wherein the address is generated based on a combination of the filtered input group and additional data.

44. The computer-readable medium of claim 43, wherein the address is generated by accessing the additional data in at least one table.

45. The computer-readable medium of claim 43, wherein the additional data includes a quantization parameter, and the generated address retrieves weight coefficients such that a low quantization parameter corresponds to one of weaker filtering and stronger filtering and a large quantization parameter corresponds to the other one of weaker filtering and stronger filtering.

46. The computer-readable medium of claim 43, wherein additional data includes a quantization parameter, and the generated address retrieves weight coefficients arranged such that the input group is adaptively either low-pass filtered or all-pass filtered when an absolute value of the filtered input is small and either all-pass filtered or high-pass filtered when the absolute value of the filtered input is large.

47. The computer-readable medium of claim 43, wherein weight coefficients are selected according to the additional data.

48. The computer-readable medium of claim 47, wherein the input group is a block of pixel values, and pixel position in the block is additional data.

49. The computer-readable medium of claim 48, wherein a table of weight coefficients selected according to a pixel having a position at a border of the block results in one of weaker filtering and stronger filtering than a table of weight coefficients selected according to a pixel having an inner position in the block.

50. The computer-readable medium of claim 48, wherein a table of weight coefficients selected according to a pixel having a position at a border of the block results in stronger low-pass filtering than a table of weight coefficients selected according to a pixel having an inner position in the block.

51. The computer-readable medium of claim 48, wherein a table of weight coefficients selected according to a pixel having a position at a border of the block results in weaker high-pass filtering than a table of weight coefficients selected according to a pixel having an inner position in the block.

52. The computer-readable medium of claim 40, wherein the generated address retrieves weight coefficients arranged such that the input group is adaptively either low-pass filtered or all-pass filtered when an absolute value of the filtered input is small and either all-pass filtered or high-pass filtered when the absolute value of the filtered input is large.

* * * * *